US011582390B2

(12) United States Patent
Itagaki et al.

(10) Patent No.: US 11,582,390 B2
(45) Date of Patent: Feb. 14, 2023

(54) DRIVING UNIT, OPTICAL-ELEMENT DRIVING DEVICE, CAMERA MODULE, AND CAMERA-MOUNTED DEVICE

(71) Applicants: Yoichi Itagaki, Tokyo (JP); Taro Watanabe, Tokyo (JP)

(72) Inventors: Yoichi Itagaki, Tokyo (JP); Taro Watanabe, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/449,097

(22) Filed: Sep. 28, 2021

(65) Prior Publication Data

US 2022/0103754 A1 Mar. 31, 2022

Related U.S. Application Data

(60) Provisional application No. 63/084,584, filed on Sep. 29, 2020.

(51) Int. Cl.
*H04N 5/232* (2006.01)
*G02B 27/64* (2006.01)
*G02B 7/09* (2021.01)
*G03B 5/02* (2021.01)

(52) U.S. Cl.
CPC ........... *H04N 5/23287* (2013.01); *G02B 7/09* (2013.01); *G02B 27/646* (2013.01); *G03B 5/02* (2013.01); *G03B 2205/0007* (2013.01); *G03B 2205/0061* (2013.01)

(58) Field of Classification Search
CPC .............. G03B 5/02; G03B 2205/0007; G03B 2205/0084; G03B 2205/0061; G03B 3/10; G02B 27/646; G02B 7/09; H04N 5/23287
See application file for complete search history.

(56) References Cited

U.S. PATENT DOCUMENTS

2021/0173175 A1* 6/2021 Itagaki ................. G02B 27/646
2022/0236583 A1* 7/2022 Eddington ........... H04N 5/2328

FOREIGN PATENT DOCUMENTS

CN 113518199 A * 10/2021 ............. G03B 17/55
WO 2015123787 A1 8/2015

OTHER PUBLICATIONS

Characteristics of Diamondlike Carbon Thin Films Prepared by r.f. Plasma Pulsed Deposition Method—Effect of Annealing Temperature, Hideo Yamada, Osamu Tsuji, Journal of the Ceramic Society of Japan 105[1] 62-67(1997).
Effect of bi-layered process on friction properties of DLC films Tokyo Metropolitan Industrial Technology Research Institute Research Report, No. 11, 2016.

* cited by examiner

*Primary Examiner* — Christopher E Mahoney
(74) *Attorney, Agent, or Firm* — Brundidge & Stanger, P.C.

(57) ABSTRACT

The driving unit includes: a first contact portion and a second contact portion that move relatively to each other while making contact with each other during driving; in which the second contact portion includes a coating layer at a contact face with the first contact portion, and the first contact portion and the second contact portion generate heat along with relative movement to vaporize a worn-away part of the coating layer.

17 Claims, 13 Drawing Sheets

DRIVING UNIT, OPTICAL-ELEMENT DRIVING DEVICE, CAMERA MODULE, AND CAMERA-MOUNTED DEVICE

TECHNICAL FIELD

The present invention relates to a driving unit, an optical-element driving device, a camera module, and a camera-mounted device.

BACKGROUND ART

In general, a small-sized camera module is mounted in mobile terminals, such as smartphones. A lens driving device having an autofocus function of automatically performing focusing during capturing of a subject (hereinafter referred to as "Autofocus (AF) function") and a shake-correcting function (hereinafter referred to as "Optical Image Stabilization (OIS) function") for reducing irregularities of an image by correcting shake (vibration) caused during capturing of an image is applied in such a camera module (see e.g., Patent Literature (hereinafter referred to as "PTL") 1).

The lens driving device having the AF and OIS functions is provided with an autofocus driving part for moving a lens part in the optical-axis direction (hereinafter, the autofocus driving part is referred to as "AF driving part") and a shake-correcting driving part for swaying the lens part in a plane orthogonal to the optical-axis direction (hereinafter, the shake-correcting driving part is referred to as "OIS driving part"). In PTL 1, a driving unit of an ultrasonic motor type is applied as the AF driving part and the OIS driving part.

CITATION LIST

Patent Literature

PTL 1
WO2015/123787

Non Patent Literature

NPL 1
Characteristics of Diamondlike Carbon Thin Films Prepared by r.f. Plasma Pulsed Deposition Method—Effect of Annealing Temperature—, Hideo Yamada, Osamu Tsuji, Journal of the Ceramic Society of Japan 105[1] 62-67 (1997)

NPL 2
"Effect of bi-layered process on friction properties of DLC films" Tokyo Metropolitan Industrial Technology Research Institute Research Report, No. 11, 2016

SUMMARY OF INVENTION

Technical Problem

However, for example, in ultrasonic motors including a driving unit having a first contact portion and a second contact portion making contact with each other, there is a possibility that both of the contact portions slide on each other during driving, to wear away each other by friction, and thus, dust is generated. That is, the drive performance of the driving unit may be deteriorated over time due to the wear of both the contact portions. In particular, while a frictional force is required to the extent that a passive element (second contact portion) can be moved between an active element (first contact portion) and the passive element, an increased frictional force makes it likely for a contact portion to be worn. Thus, the balance of the frictional force is important.

An object of the present invention is to provide a driving unit, an optical-element driving device, a camera module, and a camera-mounted device, which are capable of reducing a decrease in drive performance over time due to wear and are thus highly reliable.

Solution to Problem

A driving unit according to the present invention includes:
a first contact portion and a second contact portion that move relatively to each other while making contact with each other during driving, in which
the second contact portion includes a coating layer at a contact face with the first contact portion, and
the first contact portion and the second contact portion generate heat along with relative movement to vaporize a worn-away part of the coating layer.

An optical-element driving device according to the present invention includes:
a fixing part;
a movable part that is disposed to be spaced apart from the fixing part and holds an optical element;
a supporting part that supports the movable part with respect to the fixing part; and
a driving part that includes the above-described driving unit and moves the movable part with respect to the fixing part.

A camera module according to the present invention includes:
the above-described optical-element driving device;
a lens part that is the optical element; and
an image capturing part configured to capture a subject image imaged by the lens part.

A camera-mounted device according to the present invention is
a camera-mounted device that is an information apparatus or a transporting apparatus, the camera-mounted device including:
the above-described camera module; and
an image processing part configured to process image information obtained by the camera module.

Advantageous Effects of Invention

According to the present invention, a driving unit, an optical-element driving device, a camera module, and a camera-mounted device which are capable of reducing a decrease in drive performance over time due to wear and are thus highly reliable are provided.

DESCRIPTION OF EMBODIMENTS

Hereinafter, an embodiment of the present invention will be described in detail with reference to the accompanying drawings.

Figure 1A:
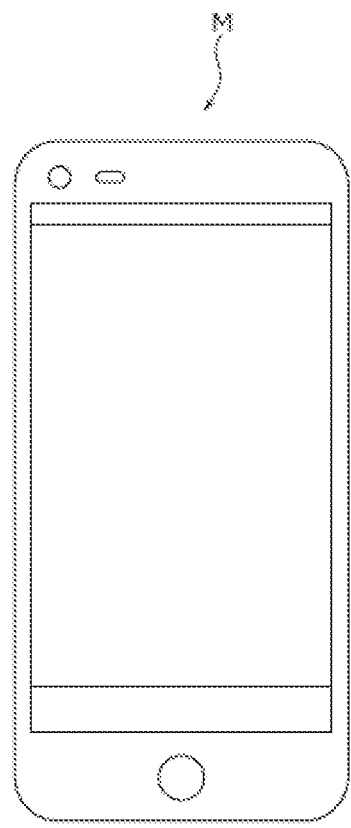
FIGS. 1A and 1B illustrate a smartphone in which a camera module according to an embodiment of the present invention is mounted.
Figure 1B:
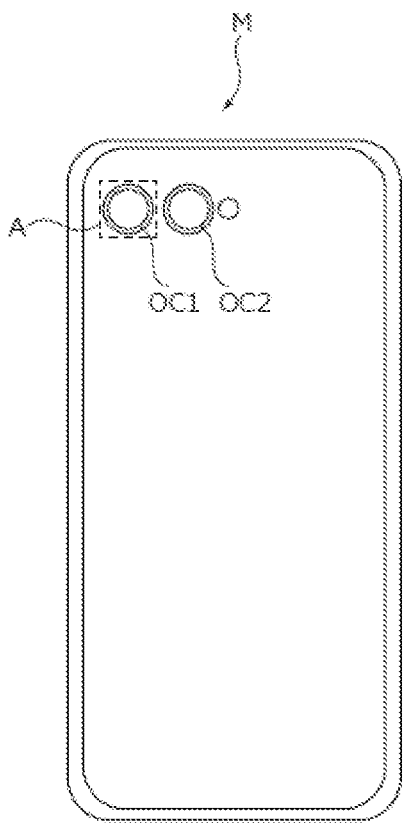

FIGS. 1A and 1B illustrate smartphone M (an example of a camera-mounted device) in which camera module A according to an embodiment of the present invention is mounted. FIG. 1A is a front view of smartphone M and FIG. 1B is a rear view of smartphone M.

Smartphone M includes a dual camera consisting of two back side cameras OC1 and OC2. In the present embodiment, camera module A is applied to back cameras OC1 and OC2.

Camera module A has an AF function and an OIS function, and can capture an image without image blurring by automatically performing focusing at the time of capturing a subject and by optically correcting shake (vibration) caused at the time of capturing the image.

Figure 2:
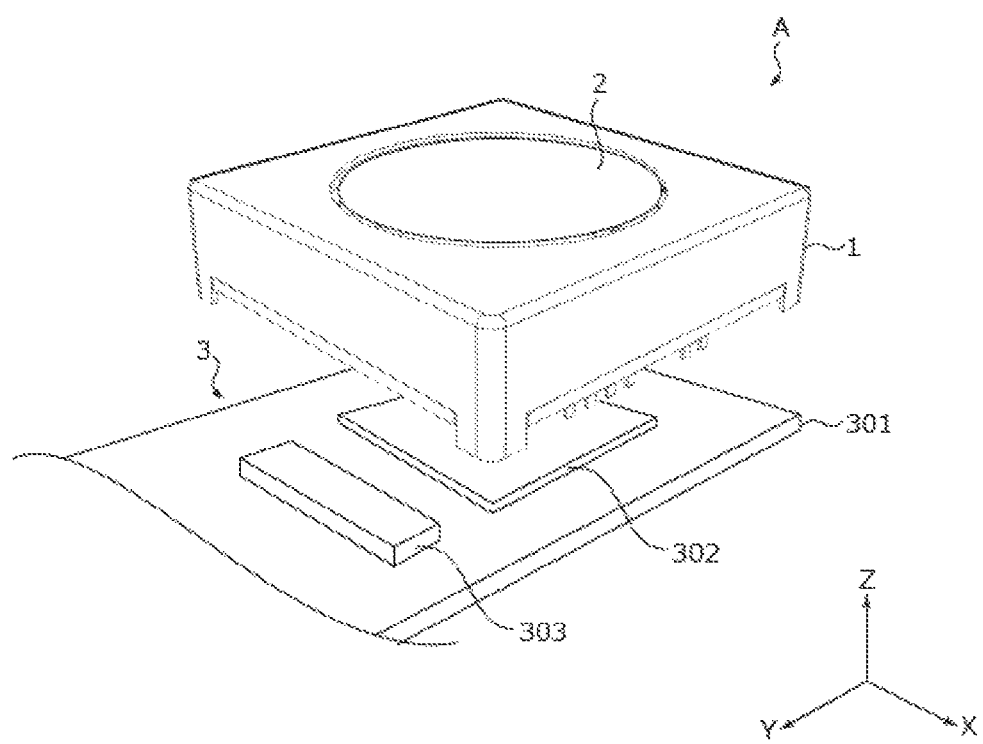
FIG. 2 is a perspective view of an external appearance of the camera module.
Figure 3A:
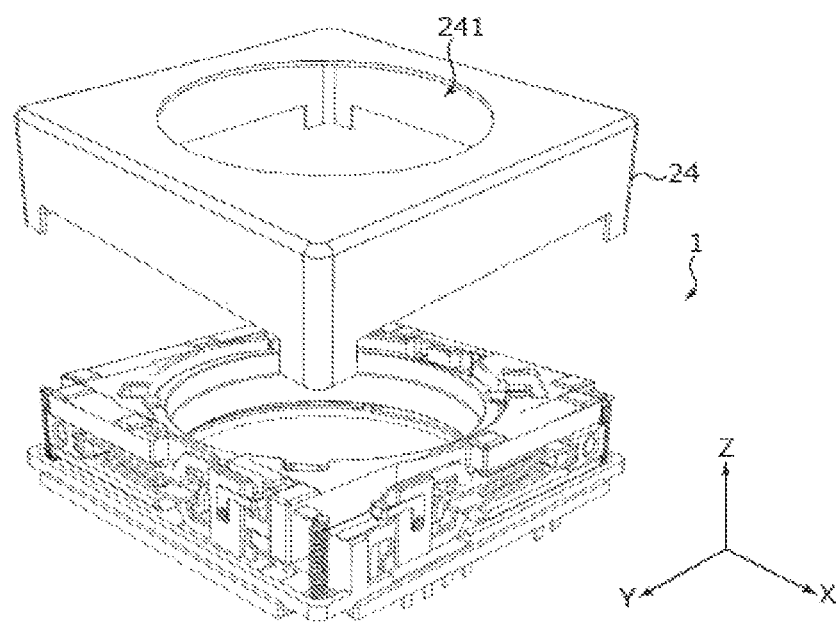
FIGS. 3A and 3B are external perspective views of an optical-element driving device according to the embodiment.
Figure 3B:
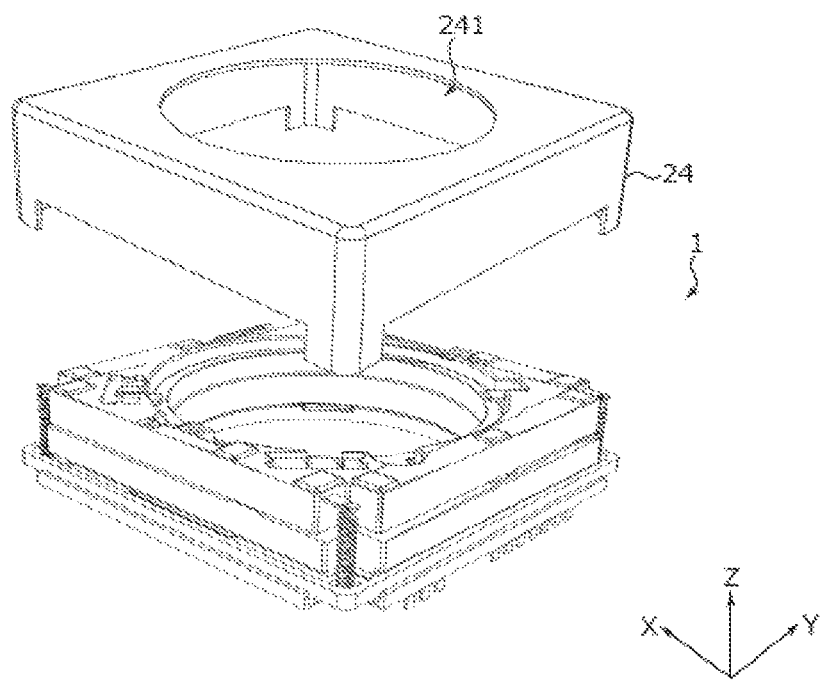

FIG. 2 is a perspective view of an external appearance of camera module A. FIGS. 3A and 3B are external perspective views of optical-element driving device 1 according to the embodiment. FIG. 3B illustrates optical-element driving device 1 rotated 180° around the Z-axis from the state of FIG. 3A. As illustrated in FIGS. 2, 3A, and 3B, the embodiment will be described using an orthogonal coordinate system (X, Y, Z). The same orthogonal coordinate system (X, Y, Z) is also used for illustration of below-mentioned figures.

Camera module A is mounted such that the vertical direction (or horizontal direction) is the X-direction, the horizontal direction (or vertical direction) is the Y-direction, and the front-rear direction is the Z-direction, for example, during actually capturing an image with smartphone M. That is, the Z-direction is the optical-axis direction, the upper side (+Z side) in the figures is the light reception side in the optical-axis direction, and the lower side (−Z side) is the image formation side in the optical-axis direction. In addition, the X- and Y-directions orthogonal to the Z-axis are referred to as "optical-axis-orthogonal directions" and the XY plane is referred to as "optical-axis-orthogonal plane."

As illustrated in FIGS. 2, 3A, and 3B, camera module A includes: optical-element driving device 1 that implements the AF function and the OIS function; lens part 2 composed of a cylindrical lens barrel and a lens housed therein; image capturing part 3 configured to capture a subject image imaged by lens part 2; and the like. That is, optical driving device 1 is a so-called lens driving device that drives lens part 2 as an optical element.

Image capturing part 3 is disposed on the image formation side of optical-element driving device 1 in the optical-axis direction. Image capturing part 3 includes, for example, image sensor board 301, image capturing element 302, and control part 303 mounted on image sensor board 301. Imaging capturing part 302 is composed of, for example, a Charge-Coupled Device (CCD) image sensor, a Complementary Metal Oxide Semiconductor (CMOS) image sensor, or the like, and captures a subject image imaged by lens part 2. Control part 303 is composed, for example, of a control IC, and performs a drive control of optical-element driving device 1. Optical-element driving device 1 is mounted on image sensor board 301 and is mechanically and electrically connected to the image sensor board. Note that control part 303 may be disposed on image sensor board 301, or may be disposed on a camera-mounted device on which camera module A is mounted (smartphone M in the embodiment).

Optical-element driving device 1 is externally covered by cover 24. Cover 24 as seen in plan view in the optical-axis direction is a capped rectangular cylindrical member. In the embodiment, cover 24 as seen in plan view in the optical-axis direction has a square shape. Cover 24 includes, in its upper surface, substantially circular opening 241. Lens part 2 faces the outside via opening 241 of cover 24 and is configured to protrude from an opening surface of cover 24 on the light reception side, for example, with movement in the optical-axis direction. Cover 24 is fixed, for example, adhesively to base 21 (see FIG. 4) of OIS fixing part 20 of optical-element driving device 1.

Figure 4:
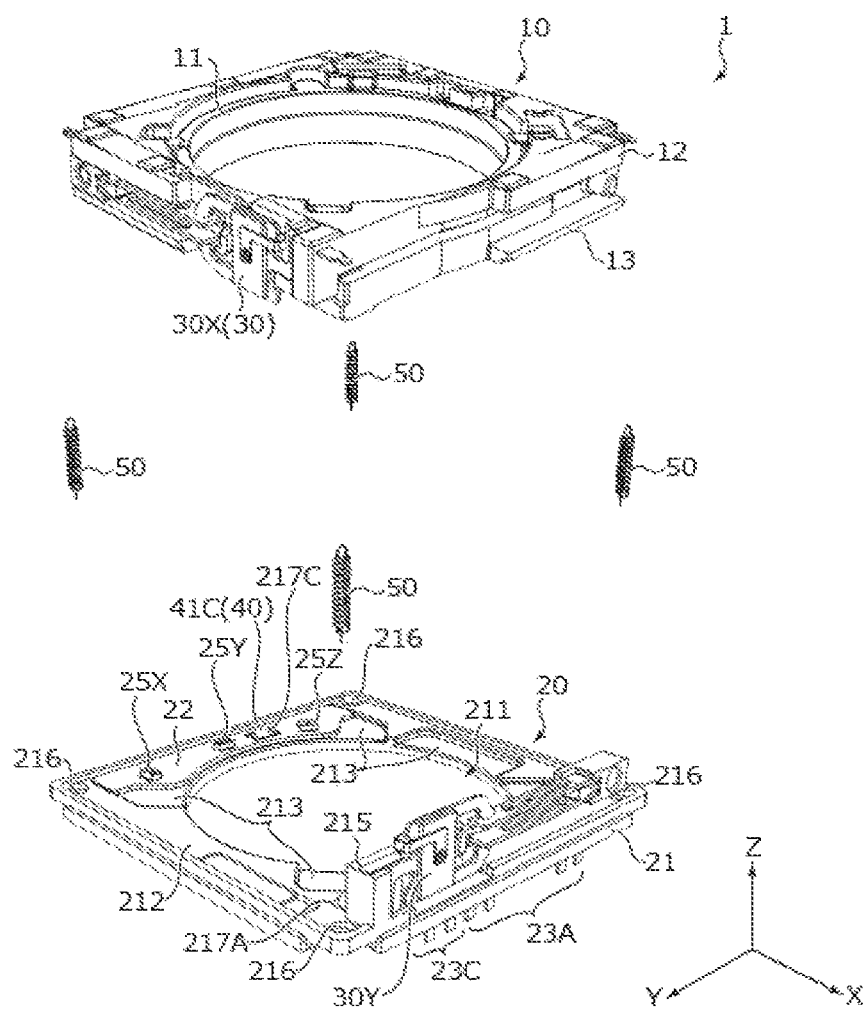
FIG. 4 is an exploded perspective view of the optical-element driving device.
Figure 5:
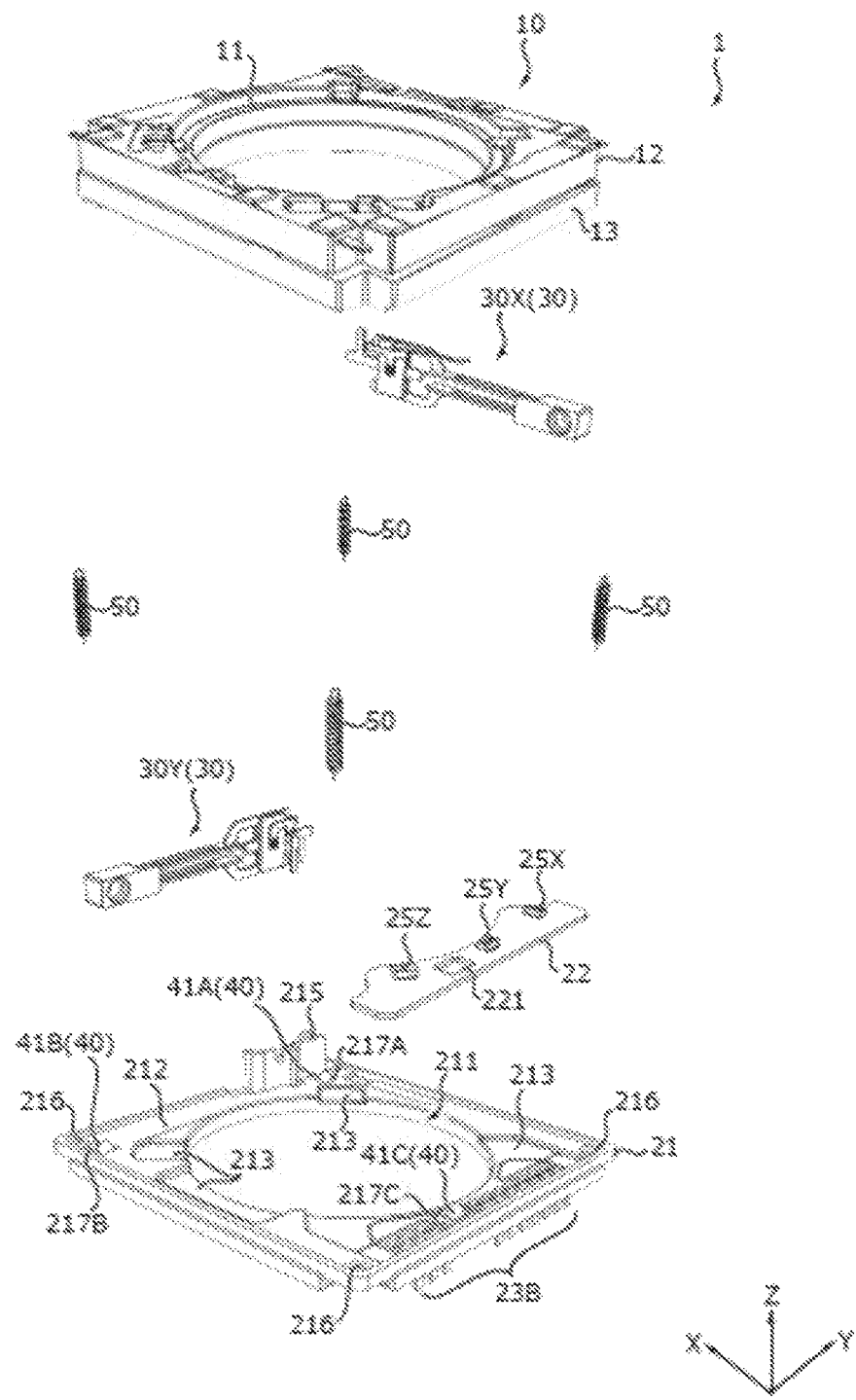
FIG. 5 is an exploded perspective view of the optical-element driving device.

FIGS. 4 and 5 are exploded perspective views of optical-element driving device 1. FIG. 5 illustrates the optical-element driving device rotated 180° around the Z-axis from the state of FIG. 4. FIG. 4 illustrates the optical-element driving device to which OIS driving part 30 and sensor board 22 are attached, and FIG. 5 illustrates the optical-element driving device from which OIS driving part 30 and sensor board 22 are detached.

As illustrated in FIGS. 4 and 5, in the present embodiment, optical-element driving device 1 includes OIS movable part 10 (second movable part), OIS fixing part 20 (second fixing part), OIS driving part 30 (XY-direction driving part) and OIS supporting part 40 (second supporting part). OIS driving part 30 includes first OIS driving part 30X (X-direction driving part) and second OIS driving part 30Y (Y-direction driving part).

OIS movable part 10 is a part that sways in the optical-axis-orthogonal plane during shake correction. OIS movable part 10 includes an AF unit, second stage 13, and X-direction reference balls 42A to 42C (see FIG. 8 or the like). The AF unit includes AF movable part 11 (first movable part), first stage 12 (first fixing part), AF driving part 14 (Z-direction driving part), and AF supporting part 15 (first supporting part) (see FIGS. 8 to 10).

OIS fixing part 20 is a part to which OIS movable part 10 is connected via OIS supporting part 40. OIS fixing part 20 includes base 21.

OIS movable part 10 is disposed to be spaced apart from OIS fixing part 20 in the optical-axis direction, and is coupled to OIS fixing part 20 via OIS supporting part 40. Further, OIS movable part 10 and OIS fixing part 20 are biased in a direction approaching each other by OIS biasing members 50. In the present embodiment, OIS biasing members 50 are disposed at four corners of optical-element driving device 1 as seen in plan view.

In the present embodiment, for the movement in the Y-direction, entire OIS movable part 10 including the AF unit moves as a movable body. In addition, for the movement in the X-direction, only the AF unit moves as a movable body. That is, for the movement in the X-direction, second stage 13 together with base 21 constitutes OIS fixing part 20, and X-direction reference balls 42A to 42C function as OIS supporting part 40.

Base 21 is formed of, for example, a molded material made of polyarylate (PAR), a PAR alloy that is a mixture of multiple resin materials containing PAR (e.g., PAR/PC), or a liquid crystal polymer. Base 21 is a rectangular member in plan view, and includes circular opening 211 at the center of base 21.

Base 21 includes first base portion 212 and second base portions 213 forming the main surface of base 21. Second base portions 213 are arranged correspondingly to portions of OIS movable part 10 protruding on the image formation side in the optical-axis direction, i.e., protruding portions 112A to 112D of AF movable part 11 and AF motor fixing portion 125 of first stage 12 (see FIGS. 8 and 9). Second base portions 213 as seen in plan view are formed to be one size larger than protruding portions 112A to 112D and AF motor fixing portion 125, respectively, in order not to cause interference during shake correction. Sensor board 22 is disposed in an area of second base portions 213 where terminal metal fixture 23B is disposed, such that the second base portions are partly exposed (such that (portions corresponding to protruding portions 112B and 112C are exposed). Second base portions 213 are formed to be recessed with respect to first base portion 212, thereby ensuring a movement stroke of AF movable part 11 and achieving reduction of the height of optical-element driving device 1.

Figure 6:
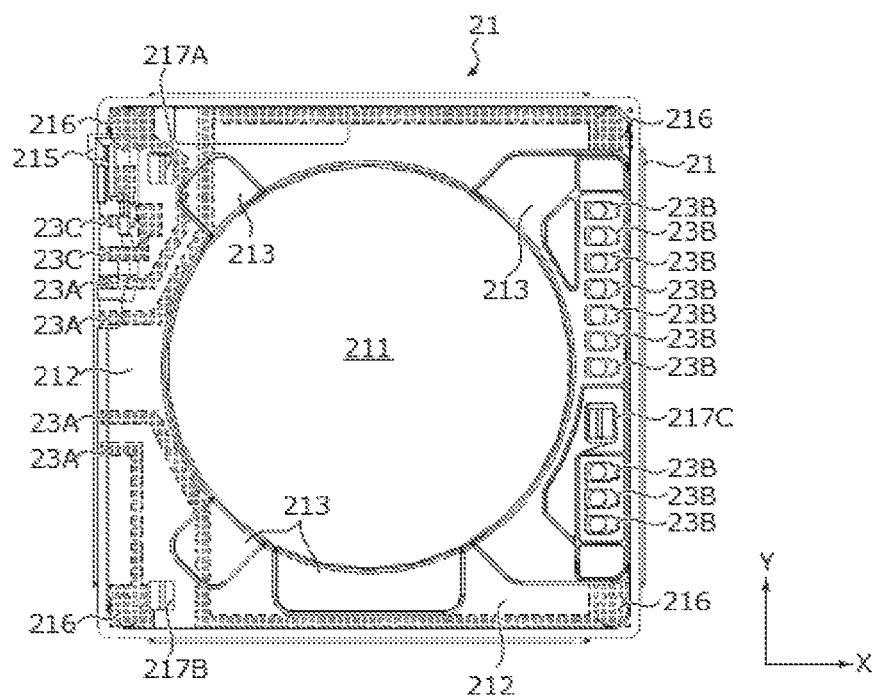
FIG. 6 is a plan view illustrating an interconnection structure of a base.

In the present embodiment, sensor board 22 is disposed in a region where AF driving part 14 and OIS driving part 30 are not disposed, i.e., in a region corresponding to one side (fourth side) of a rectangle that is a planar shape of base 21. Thus, it is possible to integrate power supply lines and signal lines for magnetic sensors 25X, 25Y, and 25Z, so as to simplify the interconnection structure in base 21 (see FIG. 6).

Base 21 includes OIS motor fixing portion 215 on which second OIS driving part 30Y is disposed. OIS motor fixing portion 215 is disposed, for example, at the corner of base 21, is formed to protrude from first base portion 212 toward the light reception side in the optical-axis direction, and has a shape allowing second OIS driving part 30Y to be held.

Terminal metal fixtures 23A to 23C are disposed in base 21, for example, by insert molding. Terminal metal fixture 23A includes a power supply line for AF driving part 14 and first OIS driving part 30X. For example, terminal metal fixture 23A is exposed in openings 216 formed in the four corners of base 21 and is electrically connected to OIS biasing members 50. Power supply to AF driving part 14 and first OIS driving part 30X is performed via OIS biasing members 50. Terminal metal fixture 23B includes power supply lines (e.g., four power supply lines) for magnetic sensors 25X, 25Y, and 25Z and signal lines (e.g., six signal lines). Terminal metal fixture 23B is electrically connected to interconnections (not illustrated) formed in sensor board 22. Terminal metal fixture 23C includes a power supply line for second OIS driving part 30Y.

Further, base 21 includes Y-direction reference ball holding portions 217A to 217C in which Y-direction reference balls 41A to 41C constituting OIS supporting part 40 are disposed. Y-direction reference ball holding portions 217A to 217C are formed to be recessed in the shape of a rectangle extending in the Y-direction. Y-direction reference ball holding portions 217A to 217C are formed in a substantially V-shape (tapered shape) in a section such that the groove width tapers toward the bottom side.

In the present embodiment, Y-direction reference ball holding portions 217A and 217B are disposed in the side (third side) of base 21 where second OIS driving part 30Y is disposed, and Y-direction reference ball holding portion 217C is disposed in the side (fourth side) where sensor board 22 is disposed. OIS movable part 10 (second stage 13) is supported at three points by Y-direction reference balls 41A to 41C.

Sensor board 22 includes the interconnections (not illustrated) including the power supply lines and the signal lines for magnetic sensors 25X, 25Y, and 25Z. Magnetic sensors 25X, 25Y, and 25Z are mounted on sensor board 22. Magnetic sensors 25X, 25Y, and 25Z are, for example, composed of a Hall element, Tunnel Magneto Resistance (TMR) sensor, or the like, and are electrically connected to terminal metal fixture 23B via the interconnections (not illustrated) formed in sensor board 22. Further, opening 221 is formed in a portion of sensor board 22 corresponding to Y-direction reference ball holding portion 217C.

Figure 10:
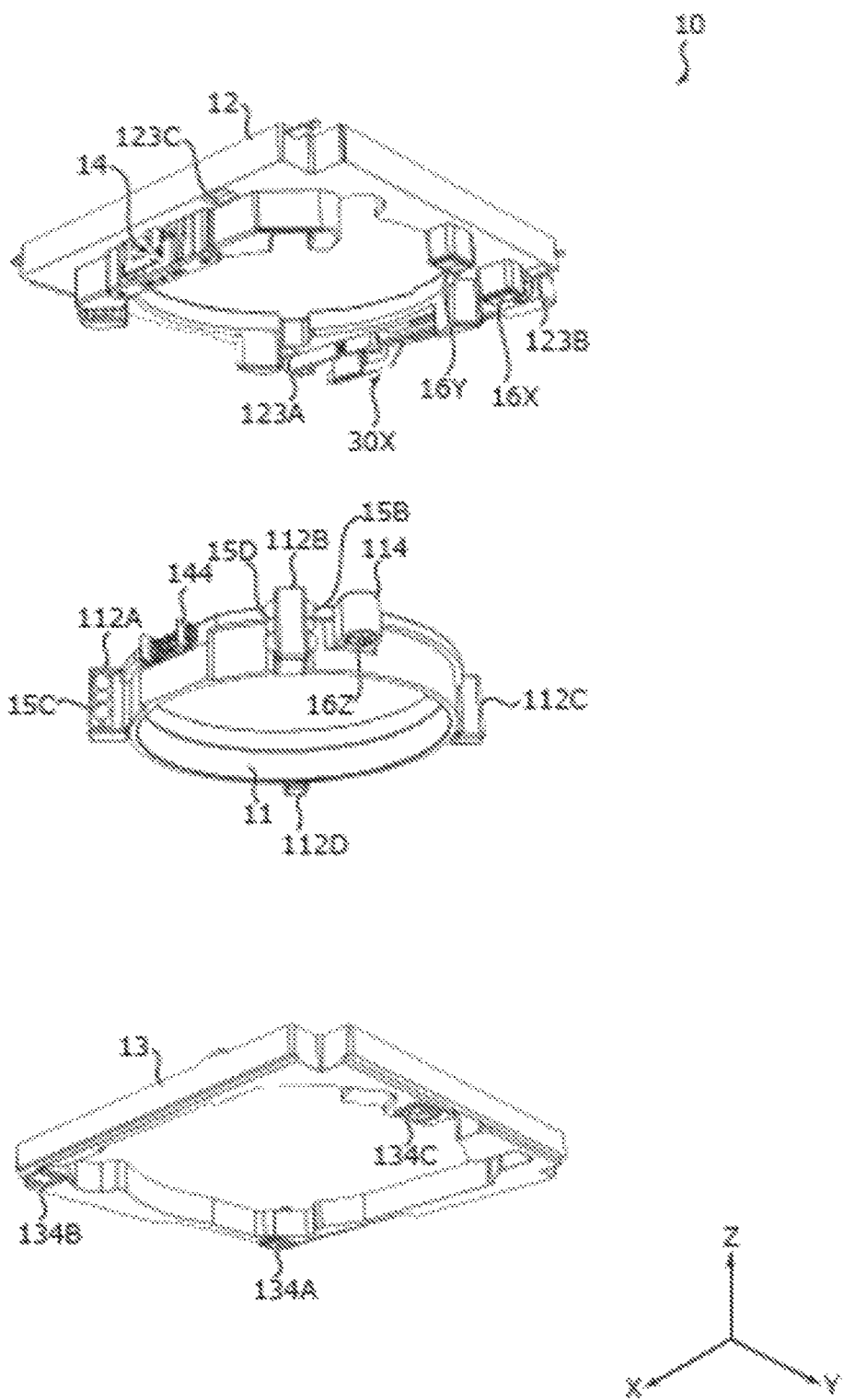
FIG. 10 is an exploded perspective view of the OIS movable part.

Magnets 16X and 16Y are disposed on first stage 12 of OIS movable part 10 at positions facing magnetic sensors 25X and 25Y (see FIG. 10). Position detection parts composed of magnetic sensors 25X and 25Y and magnets 16X and 16Y detect the position of OIS movable part 10 in the X- and Y-directions.

Further, magnet 16Z is disposed on AF movable part 11 of OIS movable part 10 at a position facing magnetic sensor 25Z (see FIG. 10). A position detection part composed of magnetic sensor 25Z and magnet 16Z detects the position of AF movable part 11 in the Z-direction. Note that, in place of magnets 16X, 16Y, and 16Z and magnetic sensors 25X, 25Y, and 25Z, an optical sensor such as a photoreflector may detect the position of OIS movable part 10 in the X- and Y-directions and the position of AF movable part 11 in the Z-direction.

OIS biasing members 50 include, for example, tension coil springs, and couple OIS movable part 10 to OIS fixing part 20. In the present embodiment, one ends of OIS biasing members 50 are connected to terminal metal fixture 23A of base 21, and the other ends are connected to interconnections 17A and 17B of first stage 12. OIS biasing members 50 are subjected to a tensile load when OIS movable part 10 is coupled to OIS fixing part 20, and act on OIS movable part 10 and OIS fixing part 20 such that OIS movable part 10 and OIS fixing part 20 approach each other. That is, OIS movable part 10 is held to be capable of swaying in the XY plane by OIS biasing members 50 while biased in the optical-axis direction (while pressed against base 21). Thus, it is possible to hold OIS movable part 10 stably without rattling.

Moreover, in the present embodiment, OIS biasing members 50 function as power supply lines for AF driving part 14 and first OIS driving part 30X.

OIS supporting part 40 supports OIS movable part 10 with respect to OIS fixing part 20 in a state where OIS movable part 10 is spaced apart from OIS fixing part 20 in the optical-axis direction. In the present embodiment, OIS supporting part 40 includes three Y-direction reference balls 41A to 41C interposed between OIS movable part 10 (second stage 13) and base 21.

Figure 8:
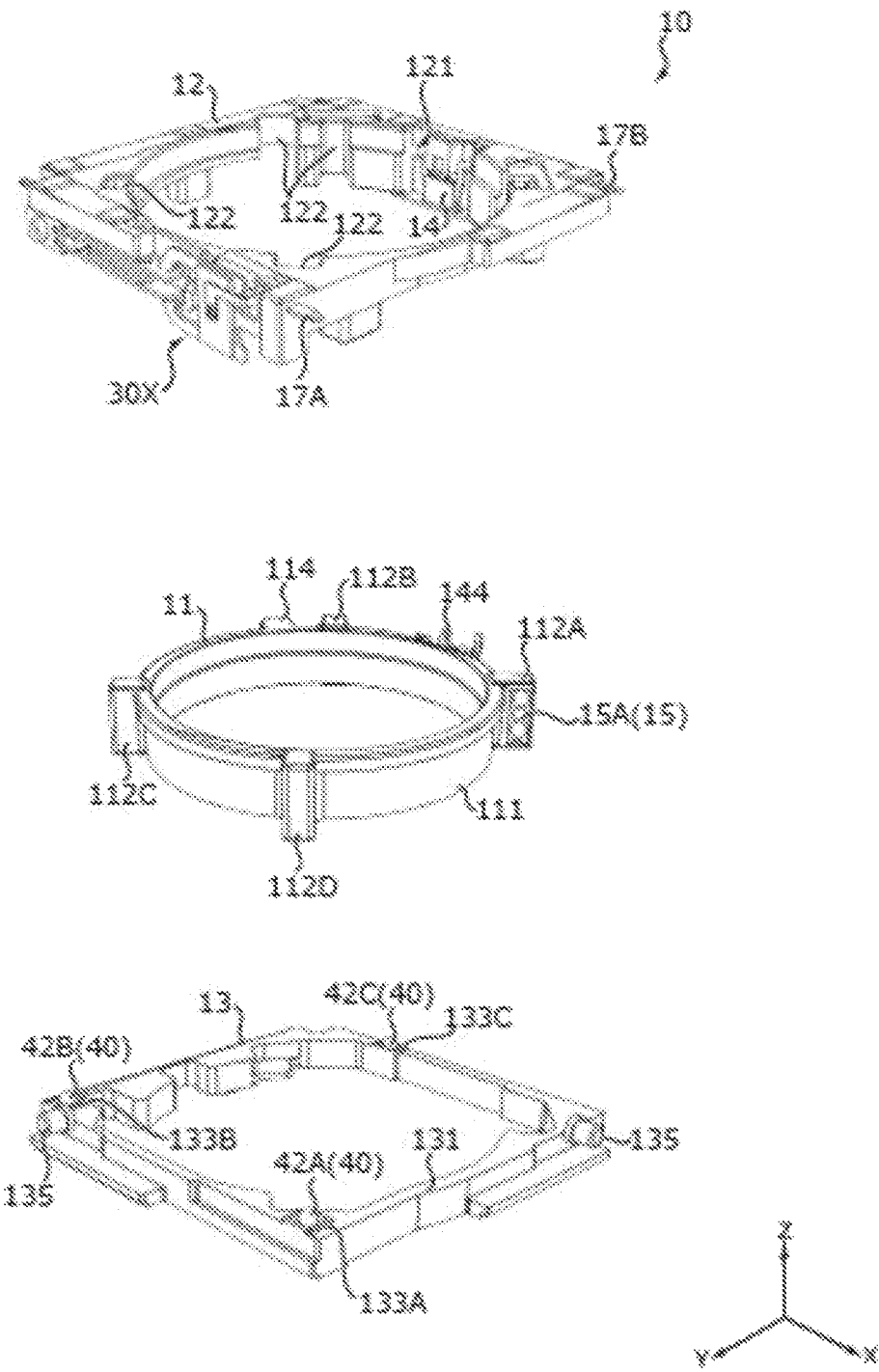
FIG. 8 is an exploded perspective view of an OIS movable part.

Further, OIS supporting part 40 includes three X-direction reference balls 42A to 42C interposed between first stage 12 and second stage 13 in OIS movable part 10 (see FIG. 8 or the like).

In the present embodiment, restricting the directions in which Y-direction reference balls 41A to 41C and X-direction reference balls 42A to 42C (total of six balls) are rollable allows OIS movable part 10 to sway in the XY plane accurately. Note that, the number of Y-direction reference balls and X-direction reference balls constituting OIS supporting part 40 can be appropriately changed.

OIS driving part 30 is an actuator that moves OIS movable part 10 in the X- and Y-directions. Specifically, OIS driving part 30 is composed of first OIS driving part 30X (first XY-direction driving part) for moving OIS movable part 10 (AF unit alone) in the X-direction, and second OIS driving part 30Y (second XY-direction driving part) for moving entire OIS movable part 10 in the Y-direction.

Each of first OIS driving part 30X and second OIS driving part 30Y is composed of an ultrasonic motor. First OIS driving part 30X is fixed to OIS motor fixing portion 124 extending along the X-direction of first stage 12 (see FIG. 9). Second OIS driving part 30Y is fixed to OIS motor fixing portion 215 of base 21 in such a manner as to extend along the Y-direction. That is, first OIS driving part 30X and second OIS driving part 30Y are disposed along the sides orthogonal to each other.

Figure 7A:
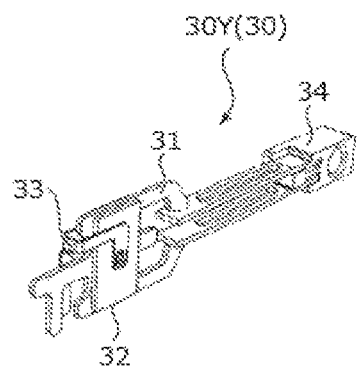
FIGS. 7A and 7B are perspective views of an OIS driving part.
Figure 7B:
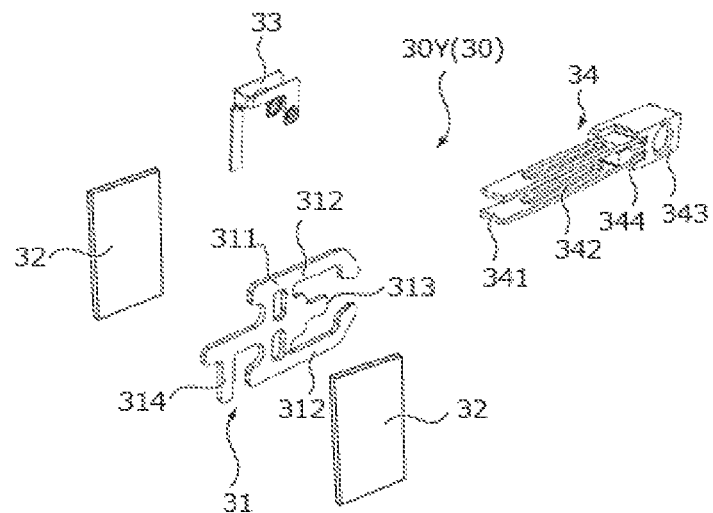

The configuration of OIS driving part 30 is illustrated in FIGS. 7A and 7B. FIG. 7A illustrates OIS driving part 30 whose members are assembled, and FIG. 7B illustrates OIS driving part 30 whose members are disassembled. Note that, although FIGS. 7A and 7B illustrate second OIS driving part 30Y, the illustrations are treated as illustrations of OIS driving part 30 since the principal configuration of first OIS driving part 30X, specifically, the configuration excluding the shape of OIS electrode 33, is the same as that of second OIS driving part 30Y.

As illustrated in FIGS. 7A and 7B, OIS driving part 30 includes OIS resonant portion 31, OIS piezoelectric elements 32, OIS electrode 33, and OIS power transmission part 34. The driving force of OIS driving part 30 is transmitted to second stage 13 via OIS power transmission part 34. Specifically, first OIS driving part 30X is connected to second stage 13 via first OIS power transmission part 34X, and second OIS driving part 30Y is connected to second stage 13 via second OIS power transmission part 34Y.

OIS piezoelectric elements 32 are, for example, plate-shaped elements formed of a ceramic material, and generate a vibration by high-frequency voltage application. Two OIS piezoelectric elements 32 are disposed to sandwich body portion 311 of OIS resonant portion 31.

OIS electrode 33 holds OIS resonant portion 31 and OIS piezoelectric elements 32 in between, and applies a voltage to OIS piezoelectric elements 32. OIS electrode 33 of first OIS driving part 30X is electrically connected to interconnection 17A of first stage 12, and OIS electrode 33 of second OIS driving part 30Y is electrically connected to terminal metal fixture 23C of base 21.

OIS resonant portion 31 is formed of a conductive material and resonates with the vibration of OIS piezoelectric elements 32 to convert the vibrational motion into a linear motion. OIS resonant portion 31 is formed, for example, by laser processing, etching processing, press working, or the like of a metal plate. In the present embodiment, OIS resonant portion 31 includes substantially rectangular body portion 311 sandwiched by OIS piezoelectric elements 32, two arm portions 312 extending in the X- or Y-direction from the upper and lower portions of body portion 311, protruding portion 313 extending in the X- or Y-direction from the central portion of body portion 311, and energization portion 314 extending from the central portion of body portion 311 on the opposite side of protruding portion 313. Two arm portions 312 have symmetrical shapes whose free end portions make contact with OIS power transmission part 34 and symmetrically deform in resonance with the vibration of OIS piezoelectric elements 32. Energization portion 314 of first OIS driving part 30X is electrically connected to interconnection 17A of first stage 12, and energization portion 314 of second OIS driving part 30Y is electrically connected to terminal metal fixture 23C of base 21.

OIS piezoelectric elements 32 are bonded to body portion 311 of OIS resonant portion 31 in the thickness direction and are held in between by OIS electrode 33, so that these are electrically connected to one another. For example, one side of a power supply path is connected to OIS electrode 33, and the other side is connected to energization portion 314 of OIS resonant portion 31. A voltage is applied to OIS piezoelectric elements 32, and a vibration is thus generated.

OIS resonant portion 31 has at least two resonant frequencies, and deforms in behaviors different between the resonant frequencies. In other words, the entire shape of OIS resonant portion 31 is set such that OIS resonant portion 31 deforms in behaviors different between the two resonance frequencies. The different behaviors include a behavior causing OIS power transmission part 34 to move forward in the X- or Y-direction, and a behavior causing OIS power transmission part 34 to move backward in the X- or Y-direction.

OIS power transmission part 34 is a chucking guide extending in one direction, whose one end is connected to arm portions 312 of OIS resonant portion 31 and whose other end is connected to second stage 13. OIS power transmission part 34 includes OIS motor contact portions 341, stage fixing portion 343, and coupling portion 342. OIS motor contact portions 341 make contact with the free end portions of arm portions 312 of OIS resonant portion 31. Stage fixing portion 343 is disposed at an end portion of OIS power transmission part 34 and is fixed to OIS chucking guide fixing portion 135 of second stage 13 (see FIG. 8 and the like). Coupling portion 342 is a portion that couples OIS motor contact portions 341 to stage fixing portion 343, and is formed to branch into two and extend from stage fixing portion 343 such that the two branch portions are substantially parallel with each other.

The width between OIS motor contact portions 341 is set wider than the width between the free end portions of arm portions 312 of OIS resonant portion 31. For example, it is possible to widen the width between OIS motor contact portions 341 by interposing, between two branches of connection portion 342 at a connection portion between coupling portion 342 and stage fixing portion 343, spacing portion 344 that is larger than the width between connection end portions. Thus, when OIS power transmission part 34 is attached between arm portions 312 of OIS resonant portion 31, coupling portion 342 functions as leaf springs, and a biasing force acts on arm portions 312 in the direction of pushing out arm portion 312. This biasing force allows OIS power transmission part 34 to be held between the free end portions of arm portions 312. Accordingly, the driving force from OIS resonant portion 31 is efficiently transmitted to OIS power transmission part 34. Spacing portion 344 is formed integrally with stage fixing portion 343, for example.

Note that, although attached portions of coupling portion 342 are released on one side at stage fixing portion 343 in the example illustrated in FIGS. 7A and 7B, stage fixing portion 343 may have a structure for sandwiching the base of coupling portion 342 (the end portions of the coupling portion on the stage fixing portion 343 side). In this case, it is possible to prevent coupling portion 342 from being displaced over time to come off, and the reliability is thus improved.

OIS resonant portion 31 and OIS power transmission part 34 are only in contact with each other in a biased state; hence, it is possible to lengthen the movement stroke of OIS movable part 10 only by increasing the contact portions in the X- or Y-direction without enlarging the outer shape of optical-element driving device 1.

First OIS driving part 30X is fixed to OIS movable part 10 (first stage 12) and is connected to second stage 13 via OIS power transmission part 34X, and moves together with OIS movable part 10 during shake correction performed by second OIS driving part 30Y in the Y-direction. On the other hand, second OIS driving part 30Y is fixed to OIS fixing part 20 (base 21) and is connected to second stage 13 via OIS power transmission part 34Y, and is not affected by shake correction performed by first OIS driving part 30X in the X-direction. That is, the movement of OIS movable part 10 by one of OIS driving parts 30 is not hindered by the structure of the other one of OIS driving parts 30. Therefore, it is possible to prevent rotation of OIS movable part 10 around the Z-axis, so as to allow OIS movable part 10 to sway in the XY plane accurately.

Figure 9:
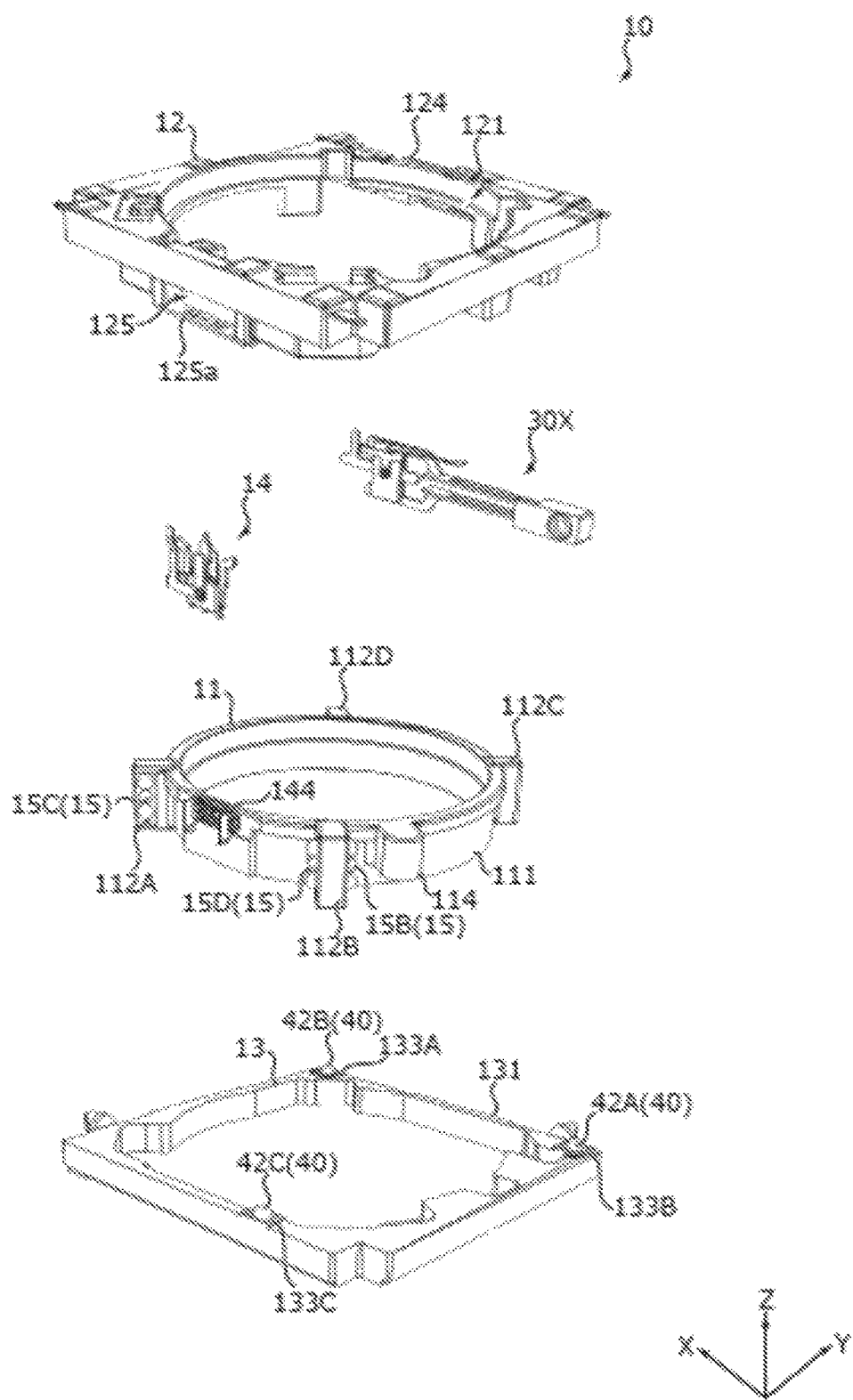
FIG. 9 is an exploded perspective view of the OIS movable part.

FIGS. 8 to 10 are exploded perspective views of OIS movable part 10. FIG. 9 illustrates OIS movable part 10 rotated 180° around the Z-axis from the state of FIG. 8. FIG. 10 is a lower perspective view illustrating OIS movable part 10 rotated 180° around the Z-axis from the state of FIG. 8. Note that, FIG. 9 illustrates a state where AF driving part 14 and first OIS driving part 30X are detached from first stage 12.

In the following, in a rectangle that is a planar shape of optical-element driving device 1, the side where AF driving part 14 is disposed is referred to as "first side," the side where first OIS driving part 30X is disposed is referred to as "second side," the side where second OIS driving part 30Y is disposed is referred to as "third side," and the remaining one side is referred to as "fourth side."

As illustrated in FIGS. 8 to 10, in the present embodiment, OIS movable part 10 includes AF movable part 11, first stage 12, second stage 13, AF driving part 14, AF supporting part 15, and the like. For the movement in the Y-direction, entire OIS movable part 10 including first stage 12 and second stage 13 is a movable body, whereas for the movement in the X-direction, second stage 13 functions as OIS fixing part 20 and only the AF unit (AF movable part 11 and first stage 12) functions as OIS movable part 10. Further, first stage 12 functions as an AF fixing part for supporting AF movable part 11.

AF movable part 11 is a lens holder for holding lens part 2 (see FIG. 2), and moves in the optical-axis direction during focusing. AF movable part 11 is disposed to be spaced radially inward from first stage 12 (AF fixing part), and is supported via AF supporting part 15 while biased toward first stage 12.

AF movable part 11 is formed of, for example, polyarylate (PAR), a PAR alloy that is a mixture of multiple resin materials containing PAR, a liquid crystal polymer, or the like. AF movable part 11 includes cylindrical lens housing 111. Lens part 2 is fixed to the inner peripheral surface of lens housing 111, for example, adhesively.

AF movable part 11 includes, at the outer peripheral surface of lens housing 111, protruding portions 112A to 112D protruding radially outward and extending in the optical-axis direction. It is preferable that protruding portions 112A to 112D be arranged symmetrically with respect to the optical axis. In the present embodiment, protruding portions 112A to 112D are disposed around the optical axis at approximately 90° intervals. Protruding portions 112A to 112D protrude on the image formation side in the optical-axis direction beyond the lower surface of lens housing 111, and make contact with second base portions 213 of base 21, to restrict the movement of AF movable part 11 on the image formation side (lower side) in the optical-axis direction. In the present embodiment, protruding portions 112A to 112D make contact with second base portions 213 of base 21 in a reference state in which AF driving part 14 is not driven.

Protruding portions 112A and 112B on the AF driving part 14 side, together with first stage 12, hold AF supporting part 15. One protruding portion 112A houses first Z-direction reference balls 15A constituting AF supporting part 15. The other protruding portion 112B houses second Z-direction reference balls 15B constituting AF supporting part 15. Further, protruding portions 112A and 112B house first pressurization balls 15C and second pressurization balls 15D constituting AF supporting part 15, respectively.

Further, magnet housing 114 for housing magnet 16Z for Z position detection is disposed on the outer peripheral surface of lens housing 111. Magnet 16Z is disposed in magnet housing 114. Magnetic sensor 25Z for Z position detection is disposed on sensor board 22 at a position facing magnet 16Z in the optical-axis direction (see FIG. 4).

Further, AF power transmission part 144 is disposed on AF movable part 11 between protruding portions 112A and 112B. AF power transmission part 144 is a chucking guide having a predetermined length in the Z-direction, and has sidewalls facing each other in the X-direction and protruding (on the −side) in the Y-direction. Arm portions 141b of resonant portion 141 of AF driving part 14 make contact with AF power transmission part 144 to push out the sidewalls of AF power transmission part 144, and the power of AF driving part 14 is transmitted to AF movable part 11. When two arm portions 141b make contact with the sidewalls of AF power transmission part 144, the sidewalls of AF power transmission part 144 function as leaf springs, whereby the driving force generated by deformation of resonant portion 141 is efficiently transmitted.

Note that, the structure of AF power transmission part 144 can be arbitrarily changed as appropriate. For example, the biasing force may be expressed in a direction pushing back arm portions 141b of AF driving part 14 by folding back the sidewalls in the Z-direction to form the leaf springs positioned on the inside of the sidewalls in the X-direction. With this configuration, the driving force caused by the deformation of resonant portion 141 is more efficiently transmitted to AF power transmission part 144.

In the present embodiment, AF power transmission part 144 is formed by a member separate from AF movable part 11. AF power transmission part 144 has a U-shape in plan view, for example, and is fixed, at the bottom portion, to the outer peripheral surface of lens housing 111 in a state where the side surface portions face each other in the X-direction. AF power transmission part 144 is formed of a metal material, for example. Thus, as compared with the case where arm portions 141b of AF driving part 30 make contact with AF movable part 11 that is a resin-molded product, the driving force of AF driving part 14 is efficiently transmitted.

Note that, AF power transmission part 144 may be integrally molded with AF movable part 11.

First stage 12 supports AF movable part 11 via AF supporting part 15. Second stage 13 is disposed on the image formation side of first stage 12 in the optical-axis direction via X-direction reference balls 42A to 42C. First stage 12 moves in the X- and Y-directions during shake correction, and second stage 13 moves only in the Y-direction during shake correction.

First stage 12 as seen in plan view in the optical-axis direction is a member having a substantially rectangular shape, and is formed of, for example, a liquid crystal polymer. First stage 12 has substantially circular opening 121 at a portion corresponding to AF movable part 11. Cutout portions 122 corresponding to protruding portions 112A to 112D and magnet housing 114 of AF movable part 11 are formed in opening 121. A portion of first stage 12 corresponding to first OIS driving part 30X (the outer surface of the sidewall along the second side) is formed to be recessed radially inward such that first OIS driving part 30X can be disposed without protruding radially outward (OIS motor fixing portion 124). Further, a portion of first stage 12 corresponding to second OIS driving part 30Y (the outer surface of the sidewall along the third side) is also similarly formed to be recessed radially inward.

First stage 12 includes, at the lower surface, X-direction reference ball holding portions 123A to 123C for holding X-direction reference balls 42A to 42C. X-direction reference ball holding portions 123A to 123C are formed to be recessed in a rectangular shape extending in the X-direction. X-direction reference ball holding portions 123A to 123C face X-direction reference ball holding portions 133A to 133C of second stage 13 in the Z-direction. X-direction reference ball holding portions 123A and 123B are formed in a substantially V-shape (tapered shape) in a section such that the groove width tapers toward the bottom side, and X-direction reference ball holding portion 123C is formed in a substantially U-shape.

AF motor fixing portion 125 in which AF driving part 14 is disposed is formed on one of the sidewalls of first stage 12 extending along the X-direction (the sidewall along the first side). AF motor fixing portion 125 includes an upper fixing plate (not illustrated) and lower fixing plate 125a, and AF driving part 14 is sandwiched between the fixing plates. For example, AF resonant portion 141 is inserted into an insertion hole (whose reference sign is not illustrated) formed in the upper fixing plate and lower fixing plate 125a, and AF driving part 14 is adhesively fixed. The upper fixing plate is formed by a part of interconnection 17B, and AF resonant portion 141 is electrically connected to interconnection 17B.

Magnets 16X and 16Y for detecting the XY position are disposed on one of the sidewalls of first stage 12 extending along the Y-direction (the sidewall along the fourth side). For example, magnet 16X is magnetized in the X-direction, and magnet 16Y is magnetized in the Y-direction. Magnetic sensors 25X and 25Y for detecting the XY position are disposed on sensor board 22 at positions facing magnets 16X and 16Y in the optical-axis direction (see FIG. 4).

In addition, interconnections 17A and 17B are embedded in first stage 12, for example, by insert molding. Interconnections 17A and 17B are disposed, for example, along the first side and the second side. Interconnections 17A and 17B are exposed at the four corners of first stage 12, and one ends of OIS biasing members 50 are connected to this exposed portions. Power supply to first OIS driving part 30X is performed via interconnection 17A, and power supply to AF driving part 14 is performed via interconnection 17B.

Second stage 13 as seen in plan view in the optical-axis direction is a member having a substantially rectangular shape, and is formed of, for example, a liquid crystal polymer. Inner peripheral surface 131 of second stage 13 is formed correspondingly to the external shape of AF movable part 11. Portions of second stage 13 corresponding to first OIS driving part 30X and second OIS driving part 30Y (the outer surfaces of the sidewalls along the second side and the third side) are formed to be recessed radially inward as in first stage 12.

Second stage 13 includes, at the lower surface, Y-direction reference ball holding portions 134A to 134C for housing Y-direction reference balls 41A to 41C. Y-direction reference ball holding portions 134A to 134C are formed to be recessed in the shape of a rectangle extending in the Y-direction. Y-direction reference ball holding portions 134A to 134C face Y-direction reference ball holding portions 217A to 217C of base 21 in the Z-direction. Y-direction reference ball holding portions 134A and 134B are formed in a substantially V-shape (tapered shape) in a section such that the groove width tapers toward the bottom side, and Y-direction reference ball holding portion 134C is formed in a substantially U-shape.

In addition, second stage 13 includes, at the upper surface, X-direction reference ball holding portions 133A to 133C for holding X-direction reference balls 42A to 42C. X-direction reference ball holding portions 133A to 133C are formed to be recessed in a rectangular shape extending in the X-direction. X-direction reference ball holding portions 133A to 133C face X-direction reference ball holding portions 123A to 123C of first stage 12 in the Z-direction. X-direction reference ball holding portions 133A to 133C are formed in a substantially V-shape (tapered shape) in a section such that the groove width tapers toward the bottom side. In the present embodiment, X-direction reference ball holding portions 133A and 133B are disposed in the side (second side) where first OIS driving part 30X of second stage 13 is disposed, and X-direction reference ball holding portion 133C is disposed in the side (first side) where AF driving part 14 is disposed. First stage 12 is supported at three points by X-direction reference balls 42A to 42C.

Y-direction reference balls 41A to 41C constituting OIS supporting part 40 are held at multiple contact points between Y-direction reference ball holding portions 217A to 217C of base 21 and Y-direction reference ball holding portions 134A to 134C of second stage 13. Therefore, Y-direction reference balls 41A to 41C roll stably in the Y-direction. Further, X-direction reference balls 42A to 42C are held at multiple contact points between X-direction reference ball holding portions 133A to 133C of second stage 13 and X-direction reference ball holding portions 123A to 123C of first stage 12. Therefore, X-direction reference balls 42A to 42C roll stably in the X-direction.

AF supporting part 15 is a portion for supporting AF movable part 11 with respect to first stage 12 (AF fixing part). AF supporting part 15 is composed of first Z-direction reference balls 15A, second Z-direction reference balls 15B, first pressurization balls 15C, and second pressurization balls 15D. In the present embodiment, each set of first Z-direction reference balls 15A, second Z-direction reference balls 15B, first pressurization balls 15C, and second pressurization balls 15D is composed of a plurality of balls (three balls in the present embodiment) arranged side by side in the Z-direction.

At least upper and lower two balls of first Z-direction reference balls 15A, second Z-direction reference balls 15B, first pressurization balls 15C, and second pressurization balls 15D only need to be held between AF movable part 11 and first stage 12. That is, the intermediate balls are provided to secure a spacing distance between the two upper and lower balls, and may have a smaller diameter than the two upper and lower balls.

AF driving part 14 is an actuator that moves AF movable part 11 in the Z-direction. Like OIS driving part 30, AF driving part 14 is composed of an ultrasonic motor. AF driving part 14 is fixed to AF motor fixing portion 125 of first stage 12 such that arm portions 141b extend in the Z-direction.

Figure 11A:
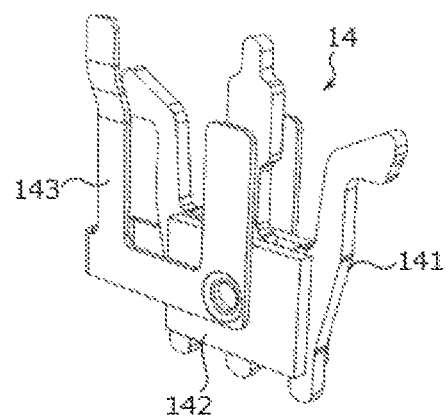
FIGS. 11A and 11B are perspective views of an AF driving part.
Figure 11B:
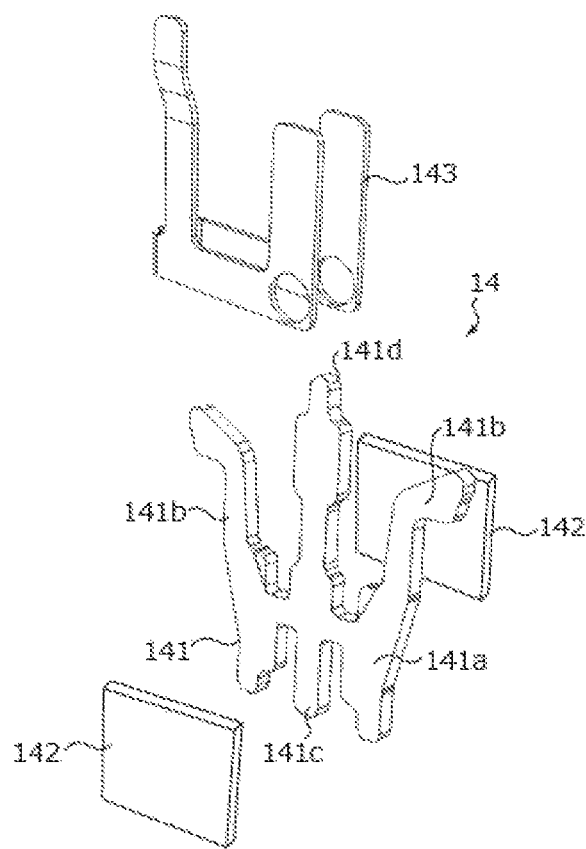

The configuration of AF driving part 14 is illustrated in FIGS. 11A and 11B. FIG. 11A illustrates AF driving part 14 whose members are assembled, and FIG. 11B illustrates AF driving part 14 whose members are disassembled. The configuration of AF driving part 14 is substantially the same as that of OIS driving part 30.

As illustrated in FIGS. 11A and 11B, AF driving part 14 includes AF resonant portion 141, AF piezoelectric elements 142, AF electrode 143, and AF power transmission part 144. The driving power of AF driving part 14 is transmitted to AF movable part 11 via AF power transmission part 144.

AF piezoelectric elements 142 are, for example, plate-shaped elements formed of a ceramic material, and generate a vibration by high-frequency voltage application. Two AF piezoelectric elements 142 are disposed to sandwich body portion 141a of AF resonant portion 141. AF electrode 143 holds AF resonant portion 141 and AF piezoelectric elements 142 in between, and applies a voltage to AF piezoelectric elements 142.

AF resonant portion 141 is formed of a conductive material and resonates with the vibration of AF piezoelectric elements 142 to convert the vibrational motion into a linear motion. AF resonant portion 141 is formed, for example, by laser processing, etching processing, press working, or the like of a metal plate. In the present embodiment, AF resonant portion 141 includes substantially rectangular body portion 141a sandwiched between AF piezoelectric elements 142, two arm portions 141b extending from body portion 141a in the Z-direction, energization portion 141c extending from the central portion of body portion 141a in the Z-direction and electrically connected to the power supply path (interconnection 17B of first stage 12 (upper fixing plate)), and stage fixing portion 141d extending from the central portion of body portion 141a on the side opposite to energization portion 141c. Two arm portions 141b has symmetrical shapes, and symmetrically deform in resonance with the vibration of AF piezoelectric elements 142. AF driving part 14 is disposed such that two arm portions 141b extend in the Z-direction and sandwich AF power transmission part 144 at the free end portions.

AF piezoelectric elements 142 are bonded to body portion 141a of AF resonant portion 141 in the thickness direction and are held in between by AF electrode 143, so that these are electrically connected to one another. When energization portion 141d of AF resonant portion 141 and AF electrode 143 are connected to interconnection 17B of first stage 12, a voltage is applied to AF piezoelectric elements 142 and a vibration is thus generated.

Like OIS resonant portion 31, AF resonant portion 141 has at least two resonant frequencies, and deforms in behaviors different between the resonant frequencies. In other words, the entire shape of AF resonant portion 141 is set such that AF resonant portion 141 deforms in behaviors different between the two resonance frequencies.

In optical-element driving device 1, when a voltage is applied to AF driving part 14, AF piezoelectric elements 142 vibrate, and AF resonant portion 141 deforms in a behavior corresponding to the frequency. The driving force of AF driving part 14 causes sliding of AF power transmission part 144 in the Z-direction. Accordingly, AF movable part 11 moves in the Z-direction, and focusing is performed. Since AF supporting part 15 is composed of balls, AF movable part 11 can move smoothly in the Z-direction. Moreover, AF driving part 14 and AF power transmission part 144 are only in contact with each other in a biased state; hence, it is possible to lengthen the movement stroke of AF movable part 11 easily only by increasing a contact portion in the Z-direction without preventing height reduction for optical-element driving device 1.

In optical-element driving device 1, when a voltage is applied to OIS driving part 30, OIS piezoelectric elements 32 vibrate, and OIS resonant portion 31 deforms in a behavior corresponding to the frequency. The driving force of OIS driving part 30 causes sliding of OIS power transmission part 34 in the X- or Y-direction. Accordingly, OIS movable part 10 moves in the X- or Y-direction, and shake correction is performed. Since OIS supporting part 40 is composed of balls, OIS movable part 10 can move smoothly in the X- or Y-direction.

Specifically, when first OIS driving part 30X is driven and OIS power transmission part 34 moves in the X-direction, power is transmitted to second stage 13 from first stage 12 in which first OIS driving part 30X is disposed. At this time, balls 41 sandwiched between second stage 13 and base 21 are incapable of rolling in the X-direction, and the position of second stage 13 with respect to base 21 in the X-direction is maintained. On the other hand, balls 42 sandwiched between first stage 12 and second stage 13 are capable of rolling in the X-direction, first stage 12 moves with respect to second stage 13 in the X-direction. That is, second stage 13 serves as a component of OIS fixing part 20, and first stage 12 serves as components of OIS movable part 10.

Further, when second OIS driving part 30Y is driven and OIS power transmission part 34 moves in the Y-direction, power is transmitted to second stage 13 from base 21 where second OIS driving part 30Y is disposed. At this time, balls 42 sandwiched between first stage 12 and second stage 13 are incapable of rolling in the Y-direction, and the position of first stage 12 with respect to the second stage in the Y-direction is maintained. On the other hand, balls 41 sandwiched between second stage 13 and base 21 are capable of rolling in the Y-direction, second stage 13 moves with respect to base 21 in the Y-direction. First stage 12 also moves in the Y-direction following second stage 13. That is, base 21 serves as a component of OIS fixing part 20, and the AF unit including first stage 12 and second stage 13 serves as a component of OIS movable part 10.

As described above, OIS movable part 10 sways in the XY plane, and shake correction is performed. Specifically, an energization voltage to OIS driving part 30 is controlled based on a detection signal indicative of an angular shake from a shake detection part (for example, a gyro sensor (not illustrated)) such that the angular shake of camera module A is canceled. In this case, it is possible to accurately control the translational movement of OIS movable part 10 by feeding back the detection result of the XY position detection part composed of magnets 16X and 16Y and magnetic sensors 25X and 25Y.

As described above, in AF driving part 14, AF resonant portion 141 and AF power transmission part 144 make contact with each other, and, when AF driving part 14 is driven, AF resonant portion 141 and AF power transmission part 144 slide on each other. Similarly, in OIS driving part 30, OIS resonant portion 31 and OIS power transmission part 34 make contact with each other, and, when OIS driving part 30 is drive, OIS resonant portion 31 and OIS power transmission part 34 slide on each other.

That is, AF driving part 14 and OIS driving part 30 are a driving unit of an ultrasonic motor type that moves a passive element (second contact portion) relatively to an active element (first contact portion). In other words, each of AF driving part 14 and OIS driving part 30 includes the ultrasonic motor that vibrates one of the active element and the passive element at a frequency in an ultrasonic range to cause friction between the active element and the passive element.

Specifically, in AF driving part 14, AF resonant portion 141 including arm portions 141*b* that deform in resonance with the vibration of AF piezoelectric elements 142 serves as the active element, and the active element converts the vibrational motion of AF piezoelectric elements 142 into a linear motion. AF power transmission part 144 serves as the passive element, and the passive element is disposed to make contact with arm portions 141*b* in a biased state.

Further, in OIS driving part 30, OIS resonant portion 31 including arm portions 31*b* that deform in resonance with the vibration of the OIS piezoelectric elements serves as the active element, and the active element converts the vibrational motion of OIS piezoelectric elements 32 into a linear motion. OIS power transmission part 34 serves as the passive element, and the passive element is disposed to make contact with arm portions 31*b* in a biased state.

Here, the combinations of sliding members that slide on each other, i.e., the combination of AF resonant portion 141 and AF power transmission part 144, and the combination of OIS resonant portion 31 and OIS power transmission part 34, are required to be excellent in wear resistance over a long period and exert a frictional force to the extent that the passive element can be moved. However, the wear resistance decreases when the frictional force is increased; that is, the frictional force and the wear resistance are incompatible properties. It is thus not easy to balance the wear resistance and the frictional force. As a result of intensive studies on the combinations of the sliding members, the present inventors have arrived at a combination capable of satisfying the requirements for AF driving part 14 and OIS driving part 30, and have completed the present invention.

In the present embodiment, by applying the driving unit according to the present invention to AF driving part 14 and OIS driving part 30, improvement in the drive performance of AF driving part 14 and OIS driving part 30 is achieved.

That is, AF power transmission part 144, which is the passive element, includes a coating layer at a contact face with AF resonant portion 141, which is the active element, and the coating layer has a hardness and a shear strength that are greater than those of AF resonant portion 141. Further, OIS power transmission part 34, which is the passive element, includes a coating layer at a contact face with OIS resonant portion 31, which is the active element, and the coating layer has a hardness and a shear strength that are greater than those of OIS resonant portion 31.

Accordingly, the active element side (AF resonant portion 141 or OIS resonant portion 31) is mainly worn away. Thus, controlling the surface state of the contact face of the active element side allows improvement in the wear resistance easily. Further, preventing the passive element side (AF power transmission part 144 and OIS power transmission part 34) from being worn allows improvement of the stability of operation. That is, when the passive element side is locally worn and a streak-shaped wear track is formed on the contact face, it is probable that unexpected operation occurs when the active-side element comes off this wear mark; however, it is possible to prevent such a problem from occurring.

Note that, a coating layer by hard plating, painting, or the like, or a surface treatment other than the coating layer may be applied to the contact faces of AF resonant portion 141 and OIS resonant portion 31, which are the active elements, for example. When the coating layer is applied, the coating layer may be formed directly on an active-side base material that is a main material of the active elements, or another member such as a plate having a coating layer may be bonded to the active-side base material.

The active-side base material (first base material) that is the main material of the active elements may be a metal having a predetermined conductivity, shear strength, hardness, specific gravity, Young's modulus, and the like, and is preferably stainless steel, for example. The Vickers hardness of stainless steel is 180 to 400 HV.

Further, AF power transmission part 144 and OIS power transmission part 34, which are the passive elements, are composed of a passive-side base material (second base material) as a main material, and the coating layer. By providing the passive element side with the coating layer having a hardness and a shear strength greater than those of the active elements, it is possible to reduce wear of the passive elements.

It is preferable that the passive-side base material have a rigidity equal to or higher than that of the active-side base material, and, for example, stainless steel is suitable. Thus, it is possible to impart a self-restoring property to AF power transmission part 144 and OIS power transmission part 34 to allow them to function as leaf springs, and it becomes easy to achieve desired frictional forces between the active elements and the passive elements. Note that, stainless steel forming the active-side base material and the passive-side base material may be of the same steel type, or may be of different steel types. For example, a suitable steel type is selected in consideration of transmission of a force from the active elements to the passive elements.

It is preferable that the coating layers of the passive elements be formed, for example, of a material containing carbon (a substance vaporized due to a frictional heat generated by contact between the active element and the passive element) such as diamond-like carbon (DLC). The Vickers hardness of DLC ranges from 1,100 to 7,000 HV, and is harder than that of stainless steel. Note that it is preferable that the coating layers be formed of a material other than a metal because if the contact faces of the active elements and the passive elements are metal, agglomeration may occur.

Note that, fine ceramics, such as zirconia ($ZnO_2$), having a Vickers hardness of 1,200 to 1,400 HV may also be applied as a variation of the coating layers. However, in particular, it has been experimentally confirmed that when DLC is applied as the coating layers, the amount of wear of the active and passive elements caused in a case where a biasing load (frictional force) is increased is small and hardly changes as compared with a case where a ceramic such as, e.g., zirconia is applied. In addition, DLC is known to have a self-lubricating property, and can be expected to exhibit the effect of reducing wear occurring on the active side despite that it has a hardness higher than that of a ceramic such as zirconia. Thus, DLC is more suitable for the coating layers from the viewpoint of ease of coping with the required biasing load.

As described above, when the coating layers on the passive element side are formed of a material harder than the material of the active elements, wear occurs mainly in the active elements. The actual amount of wear is determined by a plurality of overlapping factors such as the hardness of the sliding members, the suitability to a mating member, and the use environment. However, when the hardness of the coating layers at the contact faces is about 2.5 or more times greater than the hardness of the active-side base material, it is considered that wear of the coating layers hardly occurs regardless of other factors. Therefore, it is possible to improve the wear resistances of the driving units by intensively examining the wear resistances of the active elements.

Generally, wear is known to be affected by the surface properties of the contact faces (e.g., surface roughness). The smoother (flatter) the contact faces are, the less the wear is. Further, the active-side base material processed has a rough surface and is highly likely to cause damage such as a scrape or crack in the coating layer of the passive element.

To avoid this, in the present embodiment, planarization treatment is performed on at least the contact faces of the active-side base materials of AF resonant portion 141 and OIS resonant portion 31 coming into contact with the mating members (the passive-side coating layers). Accordingly, the surface properties are improved as compared with the state after processing, and the wear resistance of the active-side base materials is improved.

As the planarization treatment, electropolishing, barrel polishing, plasma treatment, or the like can, for example, be applied. Electropolishing is a method in which a polishing target object is used as a positive electrode and a direct current is passed through the polishing target object via an electrolytic solution to melt and smooth a metal surface. The electropolishing is performed, for example, after smoothing the metal surface to some extent by mechanical polishing using a machine tool such as a grinder. Barrel polishing is a method in which a polishing target object, an abrasive, and the like are put in a barrel tank to perform polishing by applying rotation and vibration. Plasma treatment is a method of chemically modifying the surface of a target object by plasma irradiation, and has an advantage that the method can be applied to a sheet-like object.

When the surface properties of the active-side base materials are quantitatively defined, it is preferable that density of peaks Spd at the contact faces with the passive elements be between 200,000 and 1,500,000. By using the density of peaks, true contact areas with the passive elements are properly controlled, and cohesive wear including fretting wear, and/or abrasive wear can be controlled. Accordingly, wear resistance is improved.

Incidentally, in a case where no coating layer is applied to the passive element, dust (wear powder) is generated from the active element and the passive element, both of which are metallic, when the active element and the passive element make contact with each other (slide on each other) to be worn away. In other words, in the case where no coating layer is applied to the passive element, metallic dust is generated as contact portions of the active element and the passive element become worn. However, in the present embodiment, a coating layer is applied to the passive element to improve the wear resistance of the active element and the passive element. It is thus possible to reduce the generation of the dust.

In addition, the coating layer according to the present embodiment contains carbon. In this respect, the effectiveness of the present embodiment was examined by operating the driving unit and performing sliding between the active element and the passive element repeatedly (for example, 300,000 cycles). As a result of examination, it was experimentally confirmed that significant improvement concerning the wear of the active element was achieved. That is, it was experimentally confirmed that the present embodiment makes it possible to significantly reduce the generation of dust caused by contact between the active element and the passive element.

Additionally, although part of the coating layer of the passive element was worn away, generation of dust based on a material forming the coating layer was not confirmed. Although wearing-away of part of the coating layer should mean the generation of dust of the amount of the worn-away part of the coating layer, no such dust was generated in the experiment in which the driving unit was operated.

Here, the driving unit (ultrasonic motor) is driven, for example, at a driving frequency ranging from 50 kHz to 1,000 kHz (500 kHz to 700 kHz in the actual driving example), and sliding between the active element and the passive element is repeated during driving. Accordingly, frictional heat is generated between the active element and the passive element. That is, the active element and the passive element move relatively to each other while making contact with each other during driving, and heat is generated along with the relative movement.

It is considered that, in the present embodiment, carbon contained in the coating layer underwent an oxidation reaction with oxygen around the active element and the passive element due to such frictional heat so as to be vaporized into carbon dioxide or the like. It is considered that a dust-free phenomenon occurred as a result of the vaporization even though part of the coating layer was worn away. That is, the active element and the passive element are considered to generate heat to vaporize the worn-away part of the coating layer.

Note that, for example, NPL 1 also discloses vaporizing a carbon-containing layer by high temperature. Specifically, NPL 1 suggests a view that a thin film formed of DLC (a thin film containing carbon) comes to have a high temperature, and an oxidation reaction is thus caused to vaporize carbon.

Thus, in order to confirm the occurrence of the above phenomenon in the present embodiment, experiments for verifying the phenomenon were conducted.

To begin with, an experiment was conducted with respect to disappearance of worn-away part of the coating layer after vaporization of carbon contained in the coating layer of the passive element due to heat (frictional heat). Specifically, the experiment conducted was to observe how the weight of a plate-shaped stainless-steel member on which a DLC coating layer is formed varies as the temperature is raised by blowing a high-temperature air onto the plate-shaped member.

Figure 12:
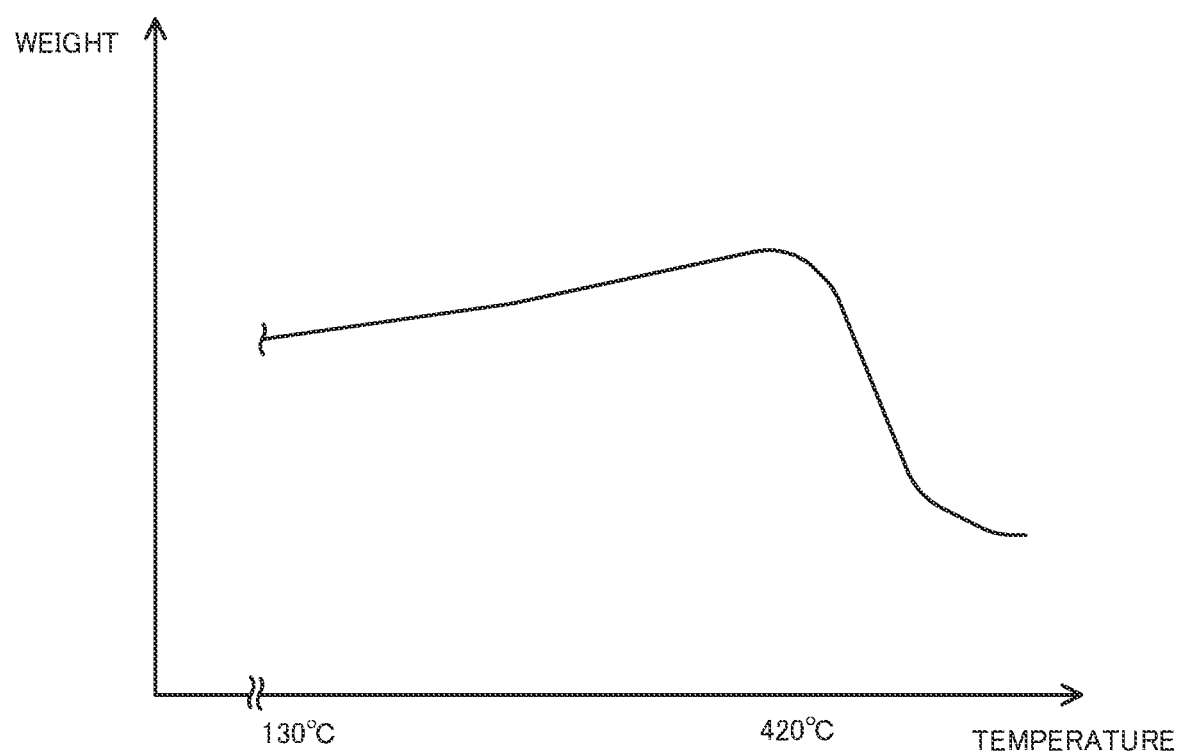
FIG. 12 illustrates a relationship between the temperature of the air blown onto the plate-shaped member and the weight of the plate-shaped member.

FIG. 12 illustrates a relationship between the temperature of the air blown onto the plate-shaped member and the weight of the plate-shaped member. Note that, the figure illustrated in FIG. 12 is a schematic illustration based on the experimental results.

As illustrated in FIG. 12, it can be confirmed that the weight of the plate-shaped member increases as the temperature of the air blown onto the plate-shaped member rises from about 130 degrees to 420 degrees. It is considered that the weight of the plate-shaped member increases by the amount of an oxide of carbon in the coating layer that has undergone an oxidation reaction due to the air, but has not yet been vaporized.

Then, it can be confirmed that the weight of the plate-shaped member decreases with rising temperature of the air above 420 degrees. It is considered that the weight of the plate-shaped member is reduced by the amount of vaporized oxide of carbon in the coating layer.

In other words, it was experimentally confirmed that part of the coating layer disappears (is worn away) through the vaporization of carbon caused by the high temperature, that is, the frictional heat.

Next, an experiment was conducted to confirm that an oxidation reaction occurs owing to the contact (frictional heat) between the active element and the passive element. In this experiment, the driving unit of an ultrasonic motor type was operated in which since carbon is vaporized and disappears, the coating layer contains, as an additive, a material (e.g., silicon), an oxide of which is solidified at room temperature or the like.

Specifically, in the experiment conducted, DLC in the coating layer of the passive element contained silicon, and sliding between the passive element and the active element was repeatedly performed. As a result, it was confirmed that the coating layer was worn away and dust was generated.

It was confirmed that the generated dust was an oxide of silicon, such as silicon dioxide. It was thus confirmed that the oxidation reaction occurred owing to the contact (frictional heat) between the active element and the passive element, and thus the oxide was generated.

That is, it was experimentally confirmed that the substance contained in the coating layer underwent the oxidation reaction with oxygen contained in the air around the coating layer owing to the contact between the active element and the passive element.

Through the above experiments, it was confirmed that in the driving unit according to the present embodiment, the coating layer was vaporized due to the frictional heat generated by driving the driving part between the active element and the passive element. In other words, it was confirmed that when the driving unit drove the active element and the passive element such that the active element and the passive element move relatively to each other, the temperature of the coating layer is raised to a temperature at which the coating layer is vaporizable.

To be more specific, in the driving unit according to the present embodiment, the active element and the passive element make contact with each other and slide on each other in response to the vibration of the active element, so that frictional heat is generated between the active element and the passive element. Then, by the frictional heat, carbon (DLC) contained in the coating layer undergoes an oxidation reaction with oxygen contained in the ambient air to vaporize.

That is, in the present embodiment, it is possible to reduce dust generated due to wearing away of the coating layer caused by the contact between the active element and the passive element.

Consequently, it is possible to reduce a decrease in the drive performance over time due to wear of the active element and the passive element, so as to improve the reliability of a product to which the driving unit is applied.

Note that, the frictional heat between the active element and the passive element is not necessarily generated over the entire range or a wide range of the coating layer. The flash temperature generated locally at a sliding contact portion between the active element and the passive element only need to be equal to or higher than the temperature at which the coating layer is vaporizable.

In addition, in the present embodiment, the worn-away part of the coating layer is vaporized and disappears, and it is thus possible to significantly reduce dust generated due to driving of the driving unit.

While the invention made by the present inventor has been specifically described based on the preferred embodiment, it is not intended to limit the present invention to the above-mentioned preferred embodiment, but the present invention may be further modified within the scope and spirit of the invention defined by the appended claims.

For example, while smartphone M serving as a camera-equipped mobile terminal has been described in the embodiment as an example of the camera-mounted device including camera module A, the present invention is applicable to a camera-mounted device including a camera module and an image processing part that processes image information obtained by the camera module. The camera-mounted device encompasses an information apparatus and a transporting apparatus. Examples of the information apparatus include a camera-mounted mobile phone, a note-type personal computer, a tablet terminal, a mobile game machine, a web camera, and a camera-mounted in-vehicle device (for example, a rear-view monitor device or a drive recorder device). In addition, examples of the transporting apparatus include an automobile.

Figure 13A:
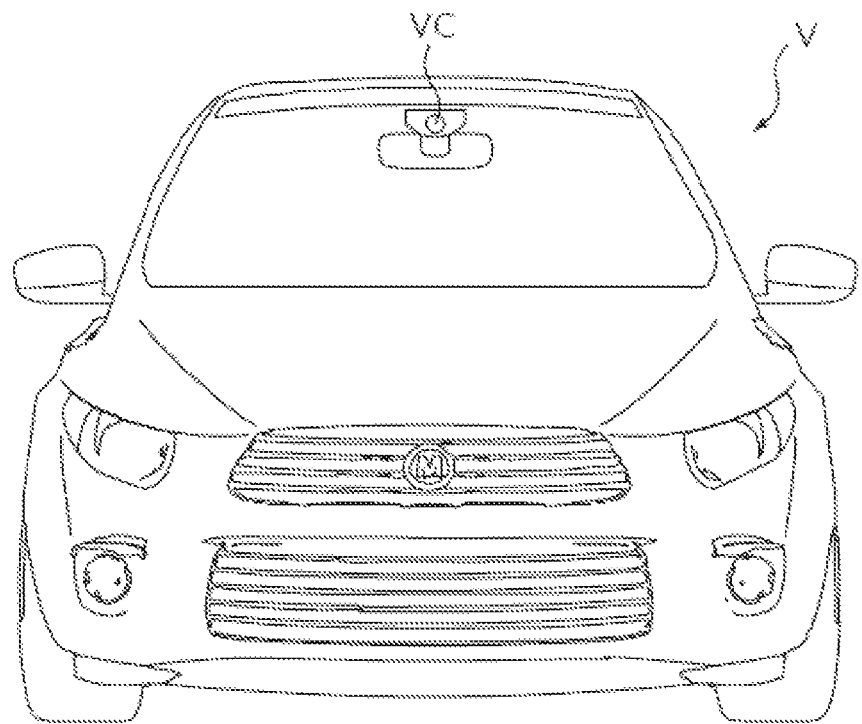
FIGS. 13A and 13B illustrate an automobile as a camera-mounted device in which an in-vehicle camera module is mounted.
Figure 13B:
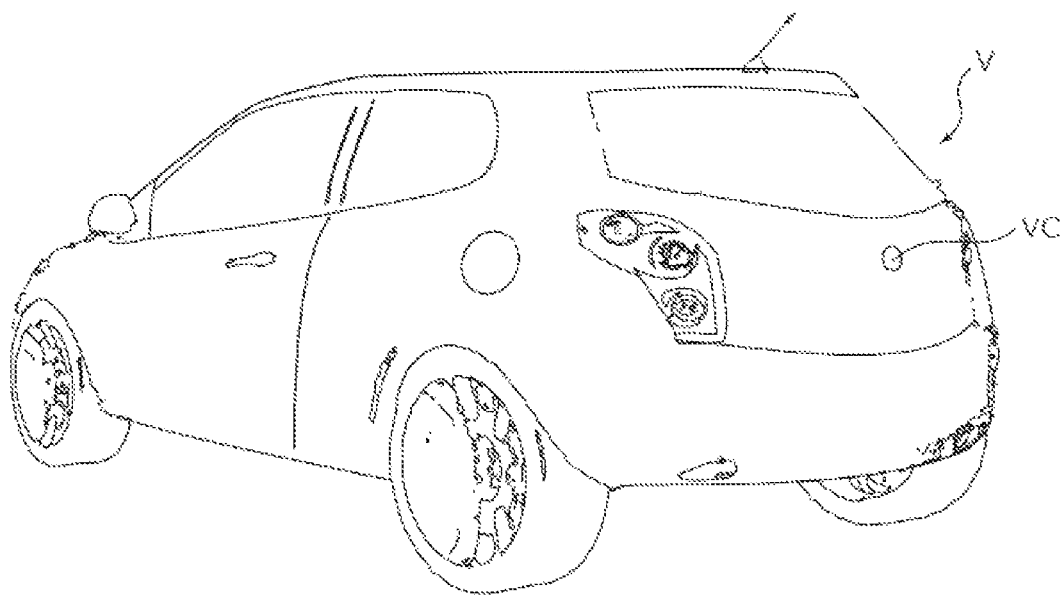

FIGS. 13A and 13B illustrate automobile V serving as the camera-mounted device in which in-vehicle camera module VC (Vehicle Camera) is mounted. FIG. 13A is a front view of automobile V and FIG. 13B is a rear perspective view of automobile V. In automobile V, camera module A described in the embodiment is mounted as in-vehicle camera module VC. As illustrated in FIGS. 13A and 13B, in-vehicle camera module VC may, for example, be attached to the windshield so as to face forward, or to the rear gate so as to face backward. In-vehicle camera module VC is used for rear monitoring, drive recording, collision avoidance control, automatic drive control, and the like.

In addition, in the above embodiment, each of the coating layers is formed of DLC, that is, formed of one layer of DLC, but the present invention is not limited thereto and may be composed of a plurality of layers.

For example, the coating layer may include a surface layer formed only of DLC and an intermediate layer disposed between the surface layer and the passive element.

It is preferable that the intermediate layer be formed of DLC. In general, it is known that the friction properties are improved by using two layers of DLC (see, e.g., NPL 2).

That is, by using the bi-layered DLC coating layer, it is possible to further improve the friction properties, and thus to further reduce a decrease in the drive performance over time due to wear, so as to further improve the reliability of a product to which the driving unit is applied.

Further, a substance (e.g., silicon) that is more heat resistant than the surface layer may be contained in the intermediate layer. It is thus possible to increase the heat resistance of the intermediate layer while reducing generation of dust on the surface layer in contact with the active element.

In addition, the above embodiment has been described by taking, as an example, the coating layers formed of DLC, but the present invention is not limited thereto. A coating layer formed of a material other than DLC may be used as long as the material contains a substance vaporized due to contact between the active element and the passive element. Further, since it is considered that the frictional heat due to the contact between the active element and the passive element changes depending on the driving frequency of the driving unit, the substance to be vaporized may be appropriately changed to a substance other than carbon in accordance with the driving frequency.

In addition, although the above embodiment has been described in relation to optical-element driving device 1 that drives lens part 2 as an optical element, the optical element to be driven may be an optical element other than a lens, such as a mirror or a prism.

The embodiment disclosed herein is merely an exemplification in every respect and should not be considered as limitative. The scope of the present invention is specified by the claims, not by the above-mentioned description. The scope of the present invention is intended to include all modifications in so far as they are within the scope of the appended claims or the equivalents thereof.

The disclosure of U.S. Provisional Application No. 63/084,584, filed on Sep. 29, 2020, including the specification, drawings and abstract is incorporated herein by reference in its entirety.

What is claimed is:

1. A driving unit, comprising:
a first contact portion and a second contact portion that move relatively to each other while making contact with each other during driving, wherein
the second contact portion includes a coating layer at a contact face with the first contact portion, and
the first contact portion and the second contact portion generate heat along with relative movement to vaporize a worn-away part of the coating layer.

2. The driving unit according to claim 1, further comprising:
a driving part that drives the first contact portion and the second contact portion such that the first contact portion and the second contact portion move relatively to each other, so as to raise a temperature of the coating layer to a temperature at which the coating layer is vaporizable.

3. The driving unit according to claim 2, wherein
the driving unit includes an ultrasonic motor that vibrates one of the first contact portion and the second contact portion at a frequency in an ultrasonic range to cause friction between the first contact portion and the second contact portion.

4. The driving unit according to claim 1, wherein:
a first base material that is a main material of the first contact portion is formed of a metal, and
the coating layer comprises at least carbon.

5. The driving unit according to claim 4, wherein
the coating layer is formed of diamond-like carbon (DLC).

6. The driving unit according to claim 5, wherein
the coating layer includes a surface layer formed only of the diamond-like carbon.

7. The driving unit according to claim 6, wherein
the coating layer includes the surface layer and an intermediate layer disposed between the surface layer and the second contact portion.

8. The driving unit according to claim 7, wherein
the intermediate layer comprises the diamond-like carbon and an additive.

9. The driving unit according to claim 8, wherein
the intermediate layer is more heat resistant than the surface layer.

10. The driving unit according to claim 4, wherein
the first base material that is the main material of the first contact portion is formed of stainless steel.

11. The driving unit according to claim 4, wherein
a second base material that is a main material of the second contact portion is formed of stainless steel.

12. The driving unit according to claim 1, further comprising:
a piezoelectric element that generates a vibration by voltage application, wherein
the first contact portion is an active element (resonator) that includes an arm portion deforming in resonance with the vibration of the piezoelectric element and converts the vibration of the piezoelectric element into a linear motion, and
the second contact portion is a passive element that is disposed to make contact with the arm portion in a biased state and moves relatively to the active element.

13. The driving unit according to claim 1, wherein
hardness and shear strength of the coating layer are greater than those of the first contact portion.

14. An optical-element driving device, comprising:
a fixing part;
a movable part that is disposed to be spaced apart from the fixing part and holds an optical element;
a supporting part that supports the movable part with respect to the fixing part; and
a driving part that comprises the driving unit according to claim 1 and moves the movable part with respect to the fixing part.

15. The optical-element driving device according to claim 14, wherein:
the first contact portion is disposed in the fixing part, and
the second contact portion is disposed in the movable part.

16. A camera module, comprising:
the optical-element driving device according to claim 14;
a lens part that is the optical element; and
an image capturing part configured to capture a subject image imaged by the lens part.

17. A camera-mounted device that is an information apparatus or a transporting apparatus, the camera-mounted device comprising:
the camera module according to claim 16; and
an image processing part configured to process image information obtained by the camera module.

* * * * *